US009989156B2

(12) United States Patent
Mayr et al.

(10) Patent No.: US 9,989,156 B2
(45) Date of Patent: Jun. 5, 2018

(54) PRESSURE CONTROL VALVE WITH CONTROL ELEMENT

(71) Applicants: SVM Schultz Verwaltungs—GmbH & Co. KG, Memmingen (DE); ZF Friedrichshafen AG, Friedrichshafen (DE)

(72) Inventors: Karlheinz Mayr, Bregenz (AT); Georg Scherer, Kirchheim (DE); Helmut Mang, Memmingen (DE)

(73) Assignee: SVM Schultz Verwaltungs—GmbH & Co. KG, Memmingen (DE)

( * ) Notice: Subject to any disclaimer, the term of this patent is extended or adjusted under 35 U.S.C. 154(b) by 32 days.

(21) Appl. No.: 14/329,240

(22) Filed: Jul. 11, 2014

(65) Prior Publication Data

US 2015/0013802 A1    Jan. 15, 2015

(30) Foreign Application Priority Data

Jul. 12, 2013    (DE) .......................... 10 2013 107 390

(51) Int. Cl.
| | |
|---|---|
| *F16K 15/18* | (2006.01) |
| *F16K 31/06* | (2006.01) |
| *F16K 1/38* | (2006.01) |
| *F16K 1/54* | (2006.01) |
| *F16K 11/056* | (2006.01) |

(52) U.S. Cl.
CPC ................ *F16K 1/38* (2013.01); *F16K 1/54* (2013.01); *F16K 15/183* (2013.01); *F16K 31/06* (2013.01); *F16K 31/0634* (2013.01); *F16K 11/056* (2013.01); *Y10T 137/8667* (2015.04);

(Continued)

(58) Field of Classification Search
CPC ........ F16K 15/183; F16K 31/06; F16K 31/02; F16K 31/0634; F16K 1/34; F16K 1/38; F16K 1/54; F16K 11/056; F16D 48/02; G05D 16/2016; G05D 16/2033; Y10T 137/87217; Y10T 137/87209;
(Continued)

(56) References Cited

U.S. PATENT DOCUMENTS 3,395,890 A  *  8/1968  Eckert ..................... F16K 25/02
                                                 137/625.65
3,979,105 A  *  9/1976  Pool ........................ F16K 1/385
                                                      251/121

(Continued)

FOREIGN PATENT DOCUMENTS

| DE | 102004049962 A1 | 5/2005 |
| DE | 102004041215 A1 | 3/2006 |
| DE | 102011087264 A1 | 5/2013 |

*Primary Examiner* — Kevin Murphy
*Assistant Examiner* — Kelsey Cary
(74) *Attorney, Agent, or Firm* — Goodwin Procter LLP

(57) ABSTRACT

The invention relates to a pressure control valve, composed of at least a valve component; situated between a control chamber and a return chamber, the valve component has an orifice, which a control element can close, partially close, or open, and the control element has at least one, at least truncated cone-like first control element region with a truncated cone angle and the orifice is formed by a through opening, which extends through the orifice element and at its end oriented toward the control element, has at least one cone-like, in particular first, orifice region with a cone angle; and the cone angle is greater than the truncated cone angle.

22 Claims, 1 Drawing Sheet

(52) U.S. Cl.
CPC ............... *Y10T 137/86622* (2015.04); *Y10T 137/88054* (2015.04)

(58) Field of Classification Search
CPC ....... Y10T 137/8667; Y10T 137/86678; Y10T 137/86686; Y10T 137/86622
USPC ............. 137/596.17, 596.16, 625.2, 625.25, 137/625.64, 625.65, 625.26, 625.27
See application file for complete search history.

(56) References Cited

U.S. PATENT DOCUMENTS

| | | | | |
|---|---|---|---|---|
| 4,610,424 | A * | 9/1986 | Koppers | ............ F16K 1/36 251/121 |
| 6,065,495 | A * | 5/2000 | Fong | ............ F15B 13/0405 137/625.25 |
| 6,109,301 | A * | 8/2000 | Pfetzer | ............ B60H 1/00485 137/599.14 |
| 6,598,852 | B2 * | 7/2003 | Tomoda | ............ F16K 31/0631 251/129.14 |
| 6,789,783 | B2 * | 9/2004 | Boecking | ............ F02M 61/18 239/585.5 |
| 2004/0090296 | A1 * | 5/2004 | Ojima | ............ G05D 16/2013 335/256 |
| 2011/0042596 | A1 * | 2/2011 | Scherer | ............ F16K 31/0634 251/129.15 |

* cited by examiner

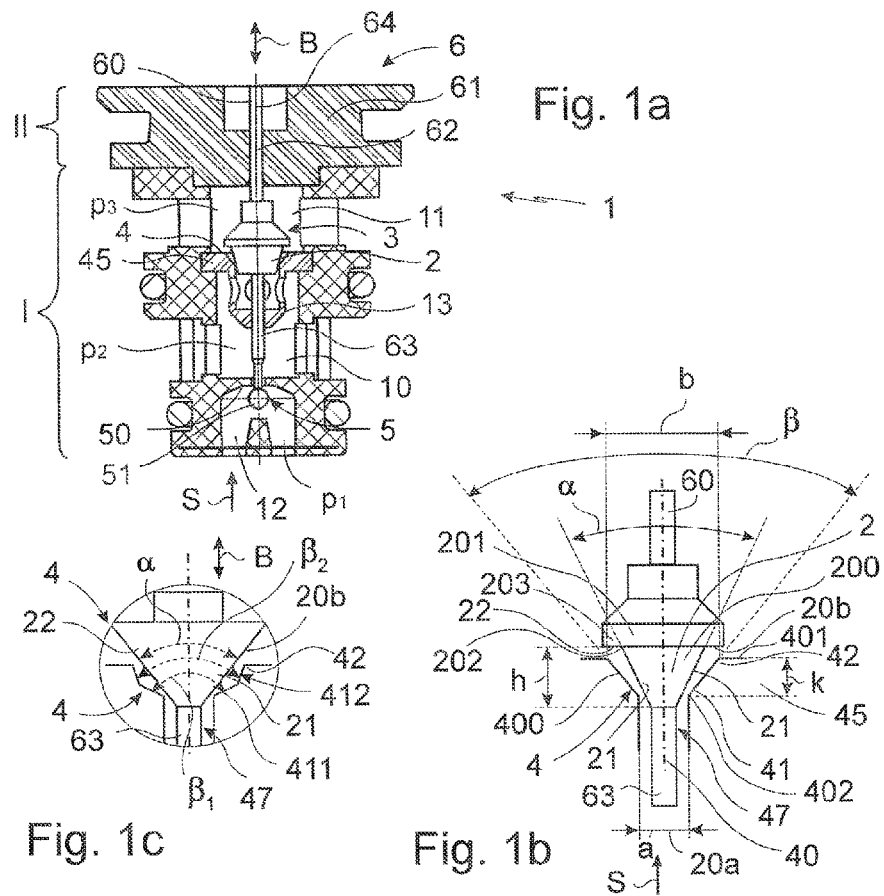
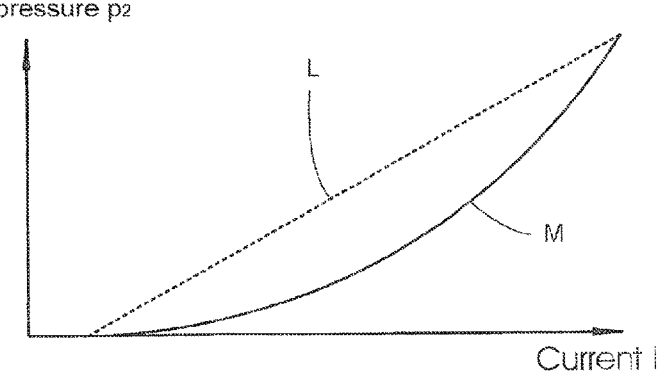
Fig. 2

PRESSURE CONTROL VALVE WITH CONTROL ELEMENT

CROSS REFERENCE TO RELATED APPLICATION

This application is a filing of German Patent Application No. 10 2013 107 390.5, filed Jul. 12, 2013, which is hereby incorporated by reference in its entirety.

BACKGROUND

The invention relates to a pressure control valve at least composed of a valve component; the valve component has an orifice that is situated between a control chamber and a return chamber and can be closed, partially closed, or opened by a control element.

SUMMARY

In multi-gear automatic transmissions for motor vehicles or automated manual transmissions for motor vehicles—both known from actual use, hydraulic switch elements embodied in the form of clutches or brakes are used to shift into different gear ratios of the transmission. In this case, in order to change or shift into a desired gear ratio of the transmission, the hydraulic switch elements are acted on with fluid pressure or are ventilated (decreased fluid pressure) in accordance with this transmission ratio. To this end, fluid valves of the transmission, in particular generic pressure control valves, are used.

In this connection, a pressure control function of the generic pressure control valves is also desirable. This is achieved in that the control element, which cooperates with the orifice, can be positioned in a correspondingly precise way in terms of its position relative to the orifice. This results in a situation in which the control element closes the orifice, partially closes it, or opens it. In the partially closed range, a corresponding pressure control takes place. This range is also referred to as the pressure control range.

The object of the present invention is to improve the known pressure control valves with a view to a more pleasant shifting comfort of the automatic transmission.

In order to attain this object, the invention starts with a pressure control valve of the type described at the beginning and proposes that the control element have at least one, at least truncated, cone-like first control element region with a truncated cone angle and the orifice is composed of a through opening that passes through the orifice element and at its end oriented toward the control element, has at least one cone-like, in particular first orifice region with the cone angle, the cone angle being greater than the truncated cone angle.

When the pressure control valves according to the invention are used, the control pressure prevails in the control chamber and a return pressure prevails in the return chamber. Because according to the invention, the cone angle is greater than the truncated cone angle, in a first, closed position that corresponds to a first control surface, the at least one control element that is embodied in the form of a truncated cone or its first control element region touches the cone-like parts of the through opening or its first orifice region. If this control valve (composed of the control element that cooperates with the orifice) now opens a little bit so that it arrives at the pressure control range, then a relatively narrow, annular cross-sectional area is formed, through which the fluid, e.g. a hydraulic fluid, can flow out of the control chamber and into the return chamber. The flow speed of the fluid is the greatest at the narrowest point, but then the passage region immediately widens out due to the differently embodied angles, which results in a slowing of the flow speed of the fluid in this region. At the same time, in this embodiment, it has been observed that such control valves embodied according to the invention deviate from the otherwise known proportionality between the control current (e.g. when the pressure control valve is operated by means of an electromagnet) and the control pressure.

Specifically, this yields a resulting effective control surface that is greater than the first control surface, which is described by the control element resting against the orifice seat. This enlarged effective, second control surface then cooperates with the control pressure.

According to the invention, the control element has at least one at least truncated cone-shaped control element region. The invention therefore includes both control elements that are composed of an entire cone or those that are composed of a truncated cone; for example, a truncated cone-shaped embodiment of the control element is produced when another slider is situated at the tip of the cone. This therefore does not yield a cone, but rather a truncated cone. The invention therefore includes both an embodiment in which the control element as a whole is embodied in the form of a cone or is at least embodied in the form of a truncated cone-like body or has at least a first control element region, which is embodied in an at least truncated cone-like fashion. The following description is of the cone or truncated cone with a cone angle.

The special feature of the invention underlying these design proposals is that in the pressure control region in which the control element has lifted away from the orifice seat, depending on the position of the control element relative to the orifice seat, a different effective control surface of the control element interacts with the control pressure. The control force produced by the action of the control pressure on the control surface counteracts the force provided by the drive component (for example an electromagnet).

In the low pressure region (the control element has lifted away from the orifice seat), the large control surface produces a flat characteristic curve. This results in a high current and pressure resolution. In the high current range, a higher output pressure is produced via the smaller control surface.

In a preferred embodiment of the invention, the pressure control valve has a drive component for the control element, which can be used to adjust the control element relative to the orifice. In this case, the drive component is, for example, an arbitrarily embodied actuator, which, thanks to an energy supply, enables a preferred linear movement of the control element. As a result, the movement of the drive component is transmitted to the control element by means of a component belonging to either the drive component or the valve component; in the simplest embodiment, for example, the drive component is a rod that can be moved in a linear fashion, which in turn supports the control element of the valve component.

Often and particularly in a variant according to the invention, the pressure control valve according to the invention is electromagnetically actuated; in an application of this kind, a drive component in the form of an electromagnet is provided, whose armature rod is connected to the control element and/or is operatively connected to it. An electromagnetically actuatable pressure control valve produces a control pressure as a function of the supplied current. The desired effect is achieved with a suitable selection of the hydraulically effective components.

The above-mentioned advantageous embodiments achieve the fact that in the lower current/pressure range, the pressure control valve according to the invention enables sensitive control of the clutches of an automatic transmission and with a high current, permits a high control pressure for transmitting more powerful torques at the clutches.

The arrangement here is selected so that at high control pressures, the control chamber is disconnected from the return chamber and as a result, the medium that is to be controlled—e.g. hydraulic fluid—cannot flow out via the return chamber and thus no pressure reduction occurs. In the pressure control region, i.e. in a position of the control element relative to the orifice such that the control pressure acts on a larger effective area, the orifice is used to produce a pressure division or pressure reduction, which, depending on the position of the control element, yields comparatively low pressures.

This embodiment of the invention suitably generates a progressive pressure control curve during operation of the pressure control valve according to the invention. The otherwise favored linear relationship between the starting current and the control pressure is suitably altered here in order to attain the object of the invention.

One example of a progressive pressure control curve is a curve of the control pressure relative to the electrical current through the coil of the electromagnet, as shown by the solid line in FIG. 2. Here, the linear relationship is depicted with a dashed line; with a progressive embodiment, the value of the first derivative of the graph increases with increasing current or the second derivative is greater than zero (in a linear relationship, the second derivative is equal to zero).

In another preferred embodiment of the invention, the control element is provided with a second control element region, which particularly in the partially open position of the pressure control valve, cooperates with a second orifice region, in particular to embody a second control surface, whereas at least a part of the first control element region cooperates with at least a part of the first orifice region in the closed position of the pressure control valve, particularly in order to embody a first control surface.

First of all, the above-mentioned modification according to the invention includes the functionality of the pressure control valve according to the invention described at the beginning, namely of the truncated cone in the cone, in which the truncated cone angle is smaller than the cone angle. Even with this embodiment, an effective second control surface is produced, but in a variant according to the invention included in this proposal, can also be implemented in the form of an actual geometrical element.

The embodiment according to the invention can be described in the following additional analogous model in order to depict the functionality according to the invention even more clearly. An essential special feature of the invention lies in the fact that instead of one throttle region in the orifice, (at least) two throttle regions are suitably integrated into the design. As a result, the larger control surface is defined by an addition of the smaller control surface (when the orifice is closed) and the partial surface that is additionally effective when the orifice is partially open. As defined by the invention, the control pressure in this context is also understood according to the invention to be a possibly partial, i.e. spatially separate, control pressure because it is quite possible for a first working pressure to act on the first or "smaller" control surface and for a pressure that is slightly reduced relative to this to act on the second partial surface (which is also spaced apart from the first partial surface) since the throttling action of the first region (first orifice region) must be taken into account. This differentiated consideration is included in the term "control pressure," as defined and used according to the invention.

According to a preferred modification of the invention, the orifice region has two or more cone-like orifice region sections, each with at least partially different cone angles; at least one cone angle is greater than the truncated cone angle. In this exemplary embodiment, the orifice or its orifice region is divided into a plurality of cone-like orifice region sections. Each of these orifice region sections has its own cone angle and at least some of these cone angles are different from one another; at least one cone angle of the orifice region of the orifice region sections is greater than the truncated cone angle.

In particular, an additional cone angle of the orifice region sections is smaller than the truncated cone angle and as a result, the flow cross-section downstream of the first annular surface formed in the closed position decreases again in size downstream of this in the flow direction, thus forming at an effective diameter of the truncated cone, another, second control surface.

It is clear that according to the invention, such an orifice can have two, three, four, five, six, or even more orifice region sections, each with at least some different cone angles, which does not exclude the possibility of some orifice region sections that are not directly adjacent to each other also having the same cone angles. The advantage of an orifice embodied in this way in particular lies in the fact that the control element is truncated cone-like or cone-like, i.e. does not have to be embodied in a more complex form in order to generate a corresponding, progressive characteristic curve.

As a result of this, the second control element region adjoins the base of the cone or truncated cone, whereas the first control element region adjoins the tip of the cone or the upper region of the truncated cone (with the smaller diameter). In such an embodiment, the cone or truncated cone constitutes both the first and second control element regions adjacent to each other.

In another advantageous embodiment of the invention, the side of the cone-like control element region oriented away from the orifice is adjoined by a second disk-like, cylinder-like, or plate-like control element region. In this embodiment variant, the control element is composed of two assembled different geometric elements. The first, which can also protrude into the through opening of the orifice, is embodied as cone-like or truncated cone-like. This is adjoined by a cylinder-like or plate-like element, whose diameter is preferably at least equal to, particularly preferably greater than, the base of the cone. This second control element region consequently constitutes a disk-shaped seat on the orifice or the orifice rim and particularly with a corresponding selection of the geometry, this produces a second throttle for the pressure control valve, which results in the formation of the above-described second control surface, whose cross-sectional area is greater than that of the first control surface (in the closed position of the control valve).

In a suitable embodiment, the two orifice regions, i.e. the first orifice region and second orifice region, are primarily situated spaced apart from each other, in particular spaced apart from each other in the flow direction of the fluid. In the exemplary embodiment in which the orifice is composed of a plurality of orifice region sections with at least partially different cone angles, it is advantageous that the second orifice region is situated or provided in an orifice region section that is different from that of the first orifice region.

In a suitable embodiment, the first or second orifice region cooperates with the first or second control element region to form the above-described throttles, particularly in the pressure control setting of the pressure control valve according to the invention. Particularly if the second control element region is provided in an additional geometrical body, for example a disk or a cylinder, the second orifice region suitably forms the second orifice region at the orifice rim or at the side of the cone base.

It has been discovered that it is advantageous that the height of the first control element region or the height of the cone or truncated cone is greater than the height of the (first) orifice region or of the cone. The pressure control characteristic curve of the pressure control valve according to the invention can on the one hand be adjusted through the suitable selection of these broad parameters.

Other possibilities for adjusting the behavior of the pressure control valve according to the invention are produced through the selection of the truncated cone angle or cone angle.

Thus in a variant according to the invention, the truncated cone angle is selected in the range from 10° to 90°, preferably from 30° to 70°, particularly preferably from 45° to 65°. In particular, the truncated cone angle is, for example, 10°, 15°, 20°, 25° . . . to 90°, respectively spaced apart by 5°; the respective angle can be provided with an interval of +/−5°, preferably +/−2°. The invention/disclosure includes all of these sub-intervals.

The selection of the cone angle also influences the control characteristic curve, particularly in cooperation with the smaller truncated cone angle; preferably the cone angle is selected in a range from 50° to 120°, preferably from 60° to 100°, particularly preferably from 70° to 90°. For example, the cone angle in this case is 50°, 55°, 60°, 65°, . . . to 120°, respectively spaced apart by 5°; this cone angle can be provided with an interval of +/−5°, preferably +/−2°. The invention/disclosure includes all of these sub-intervals.

In the conventional approach, one would attempt to achieve the optimal embodiment of a sealing seat by embodying the cone angle and truncated cone angle as equal in size, but this does not produce the desired result. It has been found that particularly also when the cone angle and truncated cone angle are embodied as different, i.e. in the difference between the cone angle and truncated cone angle, and possibly also in addition to the suitable selection of the height of the cone or truncated cone, it is possible to optimize the behavior of the pressure control valve and in particular, it is possible to generate a progressive characteristic curve. It has thus been discovered that the difference between the cone angle and truncated cone angle lies in a range from 13° to 40°, preferably from 20° to 35°, particularly preferably from 22° to 30°. In particular, it is also provided that the difference between the cone angle and truncated cone angle is 13°, 15°, 17°, 19°, to . . . 39° or 41°, respectively spaced apart by 2°; this cone angle can be provided with an interval of +/−5°, preferably +/−2°. The invention/disclosure includes all of these sub-intervals.

According to an advantageous embodiment, the first and second control element region or the first and second control region are spaced apart from each other in the flow direction or in the direction of the longitudinal axis of the orifice.

In the context of the present invention, the expression "control element regions spaced apart from each other" is understood to be an arrangement of different control element regions in the flow direction of the fluid that flows through the pressure control valve and is to be controlled, e.g. a hydraulic fluid or other fluid medium. In this case, this arrangement that is spaced apart in the flow direction at least essentially corresponds to the direction of the longitudinal axis of the orifice; the longitudinal axis of the orifice is a perpendicular to the sealing surface or to the orifice ring of an imaginary sealing surface that encompasses the orifice.

The control valve according to the invention can be embodied with two stages. Basically, the orifice is provided between the control chamber and a return chamber while the valve component has another sub-valve, which is situated between the control chamber and a connection. This yields a two-stage design of the pressure control valve according to the invention; in addition to the sub-valve, there is also the control valve composed of the orifice and the cooperating control element; in the flow direction of the fluid, the sub-valve is situated upstream of the control valve.

Wherever the terms control chamber and return chamber are used in this application, these terms are used as follows in the context of this application.

On the one hand, the terms "control chamber" and "return chamber" distinguish two different chambers, without interpreting the function of the control or the function of the return that takes place in this chamber; in other words, the choice of words clearly draws a distinction between these two chambers. In another interpretation, however, the term "control chamber" also defines the function-related meaning, namely that the control chamber is connected to an element to be controlled and transmits the control pressure that has been set in the control chamber to this element, for example a hydraulic element. In the same way, the term "return chamber" can likewise be interpreted to have an additional meaning, namely that the return chamber is or can be connected to a collecting chamber or return receptacle.

For the embodiment of the valve component of the pressure control valve according to the invention, preferably a metal is provided; in particular, steel or brass can be used for this. Alternatively, the valve component of the pressure control valve according to the invention can also be composed of plastic, in particular a plastic that is not attacked by the fluid or medium used. Naturally, an arrangement of different materials can also be provided in the valve component. For example, the orifice can be composed of a harder material than the control element.

The drive component (in particular the armature rod) of a pressure control valve according to the invention is likewise at least partially composed of metal, for example; in particular, steel or brass can be used for this. In a variant according to the invention, however, the drive component can also be at least partially composed of plastic.

The pressure control valve according to the invention is often also embodied with two stages; in this case, the valve component is provided with another sub-valve, which in its closed position, disconnects the control chamber from a connection. In this connection, the arrangement is often selected so that if the electro-magnet falls off or the drive component is switched off, the control element that is moved by the drive component is moved far enough away from the orifice that the latter is opened all the way and a complete pressure drop from the control chamber in the direction of the return chamber would be produced, which is not desirable and in this case, the first sub-valve, which disconnects the connection or inlet from the control chamber, is closed. It is clear that the sub-valve is situated upstream of the orifice in the flow direction of the medium. In this case, the connection pressure prevails in the connection or inlet.

DESCRIPTION OF DRAWINGS

The drawings schematically depict the invention and in particular an exemplary embodiment thereof. In the drawings:

FIG. 1a shows a sectional depiction of an exemplary embodiment of the pressure control valve according to the invention, FIG. 1b shows an enlarged view of a detail of the pressure control valve according to the invention from FIG. 1a, FIG. 1c shows an enlarged view of a detail of another exemplary embodiment of the pressure control valve according to the invention, and FIG. 2 shows the control pressure/current characteristic curve of the electromagnetically actuated pressure control valve according to the invention.

DETAILED DESCRIPTION

In the drawings, elements that are the same or that correspond to one another are respectively labeled with the same reference numerals and are thus not described again, where advisable. The basic design of the pressure control valve according to the invention 1 is in particular shown in FIG. 1a.

The pressure control valve 1 is composed of a valve component I and a drive component II. The drive component II is used to move the control element 2 of the valve component I.

The drive component II is for example embodied in the form of an electromagnet, resulting in the electromagnetically actuated pressure control valve 1 that likewise falls within the scope of the invention.

The electromagnet 6 that constitutes the drive component II in this exemplary embodiment is depicted only partially in FIG. 1a and has a typical design such that in an armature chamber, an armature, which is composed of magnetizable material, is supported so that it can be moved by an electromagnetic field, which can be produced by a coil, preferably in opposition to the force of a return spring. The electromagnet 6 is delimited by a magnet core 61, which in particular serves to guide the magnetic field.

In this case, the armature rod 60 is either connected to the armature or is operatively connected to it so that the movement of the armature is reliably transmitted to the armature rod 60.

The same is also true for the connection of the armature rod 60 to the control element 2. The arrangement is selected so that the magnet core 61, which is part of the electromagnet 6, has a through opening 62 through which the armature rod 60 extends out from the magnet core 61 in a downward direction in the exemplary embodiment shown here and protrudes into the valve component I of the pressure control valve 1.

In particular, the armature rod 60 is supported in the through opening 62 of the magnet core 61, in particular, is supported to permit an axial movement.

At its end oriented away from the electromagnet 6, the armature rod 60 is connected to or operatively connected to the control element 2, which is a component of the valve component I; instead of a rigid connection, this can, for example, be implemented in the form of a loose, but for example spring-loaded connection. Both of the variants mentioned above fall within the scope of the invention.

The pressure control valve 1 in the exemplary embodiment shown in FIG. 1a has a two-stage design in its valve component I. At the connection 12, the medium to be controlled or regulated—usually a liquid such as hydraulic fluid or the like—is supplied at a connection pressure p1. The connection 12 is restricted or limited in the flow direction S of the medium from the sub-valve 5. The sub-valve 5 in this case is composed of a sub-valve orifice 50, which is embodied as a through bore, and a closure element 51, which closes or opens the sub-valve orifice 50 and in the embodiment shown here, is embodied in the form of a closing ball.

The arrangement here is selected so that the closure element 51 in the connection 12 is pressed against the seat of the sub-valve orifice 50 by the connection pressure p1 and an action in opposition to the closing force that results from this must be exerted in order to lift it away from the seat of the sub-valve orifice 50. This opening force is transmitted by a slider 63, which on the end oriented away from the connection 12—viewed in the flow direction S—or in the adjoining control chamber 10, is guided to the sub-valve orifice 50, protrudes through it, and is thus able to act on the closure element 51.

The slider 63 here is operatively connected to the drive component II, for example the electromagnet 6. For example, it is embodied of one piece with the armature rod 60, without restricting the invention to such an embodiment. It is also possible to provide a separate drive for the slider 63. the integrated embodiment of the slider 63 in the armature rod 60 predetermines a mechanically coupled position, which significantly facilitates the control and regulation of the pressure control valve as a whole.

This yields two sub-valves that are mechanically connected to each other, namely the control valve 3 and the sub-valve 5, whose control element 2 and closure element 51 are jointly controlled by the drive component II.

The sub-valve 5 is then closed when the slider 63 no longer acts on the closure element 51 so that the latter is lifted away from the seat of the sub-valve orifice 50 in the chamber of the connection 12. This position results in the fact that the control element 2 in turn is spaced apart from the orifice 4 in the return chamber 11 so that this control valve 3 is opened.

In the closed position of the sub-valve 5, the closure element 51 is pressed against the sub-valve orifice 50 because of the connection pressure p1 that prevails in the connection 12.

In the flow direction S, the control chamber 10 is connected downstream of the connection 12 and downstream of the sub-valve 5 and its sub-valve orifice 50.

The control chamber 10 is fluidically connected to the component to be controlled, for example to the clutch of an automatic transmission.

In the control chamber 10, the control pressure p2 prevails, which occurs due to the position of the control element 2 relative to the orifice 4 of the second sub-valve component in the flow direction S, described here as the control valve 3.

The control valve 3 is composed of an orifice 4, which is rigidly mounted or stationary in the pressure control valve 1, and the control element 2, which can be positioned relative to the orifice 4 in accordance with the position of the armature rod 60 and/or the drive component II and thus permits a variable pressure divider to adjust or regulate the control pressure p2.

In the exemplary embodiment shown here, the slider 63, which is used to actuate the sub-valve 5, is embodied of one piece with or is rigidly embodied together with the armature rod 60, for example in a single manufacturing step. As a result, the slider 63 extends through the control chamber 10 from the orifice 4 of the control valve 3 into the sub-valve orifice 50 of the sub-valve 5. To support the slider 63 in the control chamber 10, a bearing element 13 is therefore provided, which in the exemplary embodiment shown here, is connected to the orifice 4; it can, however, also be supported in the wall surrounding the control chamber 10.

In addition to the rigid, one-piece embodiment of the slider 63 with the armature rod 60, it is naturally also conceivable to use a mechanically cooperating, but otherwise separate embodiment in which, for example, the slider 63, as a separate component, is spring-loaded against the front end of the armature rod 60.

As has already been explained, the control pressure p2 is controlled by setting the pressure drop via the control valve 3 and/or the orifice 4.

In this case, the control valve 3 and the orifice 4 disconnect the control chamber 10 from a return chamber 11; preferably, the return chamber 11 is simultaneously connected to a collecting receptacle or reservoir for the medium, in particular the hydraulic fluid; the return pressure p3 prevails in the return chamber 11.

The movement of the control element 2 (see double arrow B) now occurs parallel to the movement direction of the armature rod 60, which in turn is moved parallel to its longitudinal axis 64 by the drive component II/electromagnet 6.

In the exemplary embodiment shown here, the longitudinal axis 64 is at least parallel, if not in fact identical, to the longitudinal axis 40 of the orifice.

FIG. 1b shows the design of the control valve 3 in detail, in particular the cooperation of the control element 2 with the orifice 4 in the control valve 5 according to the invention.

FIG. 1b shows the orifice 4. It is composed of a through opening 47, which passes through the orifice element 45. The through opening 47 is also described by the longitudinal axis 40 of the orifice, which constitutes its central axis, for example. The flow direction of the medium is labeled with the reference letter S. In the flow direction S, the through opening 47 initially has a first, smaller diameter and/or cross-section. With reference to the flow direction S, the control element 2 cooperates with the orifice 4 from the rear; in this case, the pressurized medium tries to lift the control element 2 away from the orifice 4 (by contrast with the situation in the sub-valve 5); the drive component II is provided for this purpose and exerts the necessary adjusting force.

In the direction opposite from the flow direction S, the control element 2 is adjoined by the slider 63, which extends through the through opening 47 in the direction of the control chamber 10 in order to actuate the closing element 51 of the sub-valve 5.

In the flow direction S, at the end of the orifice, the through opening 47 widens out in conical fashion. The cone formed by this is labeled with the reference numeral 400 and has a height k.

The cone 400 is described by the cone angle ß, which is greater than the truncated cone angle α of the control element 2. The otherwise cylindrical through opening 47 transitions at an edge 402 into the cone 400; alternatively, it is possible for this edge to be rounded, i.e. embodied with a radius or with a continuous transition.

The through opening 47 is described by a longitudinal axis 40 of the orifice, which serves as the central axis here. At its end viewed in the flow direction S, the orifice 4 is delimited by a rim surface 401. This rim surface 401 surrounds the cone 400 in annular fashion and in the exemplary embodiment here, is oriented at right angles to the longitudinal axis 40 of the orifice. This orifice delimiting surface 401 then also supports the second orifice region 42, which in cooperation with the second control element region 20b, can define the pressure control characteristic curve of the pressure control valve 1 according to the invention. In the exemplary embodiment here, the orifice delimiting surface 401 is oriented at right angles to the central axis 40, which corresponds to an imaginary cone angle of 180°. This delimiting surface, however, can also be embodied in cone-like fashion and in particular, can have a cone angle of 120° to 180° (disclosed with 5° steps) and in particular, can consequently also define another cone-like orifice region section.

In the exemplary embodiment here, the control element 2 has at least two sections. The control element 2 is driven by a drive rod 60, for example an armature rod 60 of an electromagnet 6. The adjusting movement of the armature rod 60 and of the control element 2 is produced in opposition to the fluid pressure, characterized by means of the flow direction S.

The control element 2 shown here has at least two geometric elements that are of interest for the function of the pressure control valve according to the invention.

First, the truncated cone 200 is provided, which protrudes into the orifice 4 and/or the through opening 47 particularly in the region of the cone 400. The truncated cone 200 in this case is described on the one hand by a truncated cone angle α, which is characteristically smaller than the cone angle ß, and by the height h, which is greater than the height k of the cone.

Instead of the truncated cone 200 shown here, it is naturally also possible to embody an entire cone. In this case, the second sub-valve is controlled not by means of the slider, but by means of another method. As a cylindrical component, the slider 63 preferably adjoins the truncated cone in an integrated fashion and extends through the through opening 47.

The side of the truncated cone 200 oriented away from the slider 63 is then adjoined by a disk-shaped or cylindrical element 201 whose diameter is greater than the diameter of the truncated cone at its base.

This forms a circular inner corner 202 between which the truncated cone 200 and the cylindrical body 201; at least the side surface 203 of the cylindrical element 201 oriented toward the truncated cone 200 is oriented at right angles to the longitudinal axis 40 of the orifice.

As described above, the orifice delimiting surface 401 encompasses the cone 400 in annular fashion and describes an internal width or diameter b. The diameter of the cylinder 201 is slightly larger than the internal width b in order to cover the orifice 4; a closing of the orifice 4 is not provided by the second control element region 22 formed here or by the sealing surface 20b, but rather by the first control element region 21 situated upstream of it in the flow direction S, which cooperates with the first orifice region 41.

In this case, it is in particular the transition region 402, which transitions from the cone 400 into the cylindrical through opening 47, that is responsible for producing the first control surface 20a.

Through the selection of a different cone angle ß and truncated cone angle α, after the edge of the transition region 402, a widening of the annular cross-sectional area in the flow direction S forms, which then narrows down again in the region of the cylinder side surface 203 in cooperation with the orifice delimiting surface 401 and consequently forms a second control element region 22 here in cooperation with the second orifice region 42, which likewise produces a throttling action. The fluid that is supplied in the supply direction S is ideally supplied at the control pressure p2, which in this case, acts on the significantly larger second control surface 20b. Consequently, in the respective operating states (closed control valve 3 or control valve 3 operated in the pressure control range), the pressure control valve according to the invention makes available different effective control surfaces 20a, 20b, thus making it possible to adjust the characteristic curve of the pressure control valve according to the invention, as shown for example in FIG. 2.

The embodiment here is selected so that the cooperation of the first and second control element regions 21, 22 with the corresponding first and second orifice regions 41, 42 produces an (additional) throttle region in the orifice 4, in fact particularly in the region of the larger, second control surface 20b. In this case, the larger control surface 20b is situated downstream of the first, smaller control surface 20a in the flow direction S and possibly also downstream of the resulting throttle produced by it, which with a differentiated approach can result in a pressure reduction.

In the exemplary embodiment of the pressure control valve 1 according to the invention shown in FIG. 1c, the orifice region 41 is modified. It has two orifice region sections 411, 412, which each have at least partially different cone angles ß1, ß2. At the through opening 47, the first, smaller control surface 20a and the first orifice region section 411 first enclose a cone angle ß1 that is greater than the truncated cone angle α. In the flow direction S at the end of the orifice 4, the first orifice region section 411 is then adjoined by a second orifice region section 412, which likewise has a cone angle ß2; the cone angle ß2, however, is smaller than the cone angle ß1 of the first orifice region section 411. This cone angle ß2 is also smaller than the truncated cone angle α.

The effect is now such that after the corner or rim at which the through opening 47 feeds into the (first) orifice region 41, the flow cross-section for the medium widens out again until it then narrows down again in the region of the second orifice region section 412, in order in particular to form the second orifice region 42 with its corresponding throttling action.

The term "control pressure" that is defined and used in this application takes into account this possible pressure difference that can potentially occur here and includes it complete from a technical standpoint. Ideally in this model, the control pressure prevailing here is (effectively) the same as the pressure that is present against the (small) first control surface 20a.

FIG. 2 shows the progressive curve m of the control pressure p2 over the current i that is used to power the coil of the electromagnet 6. A characteristic for the progressive curve m of the pressure control valve according to the invention 1 here is the fact that the slope of the curve in the graph steadily increases with the increasing current, whereas with proportional magnets, the usual linear curve 1 has a constant slope and is invariable (=0) in the second derivative.

In this case, through the parameters of the cone angle ß, truncated cone angle α, difference angle ß–α, cone height h, and truncated cone height k, the invention provides a plurality of design-related adjusting screws to adjust and optimize the progressiveness of the curve M.

The present filing of claims with the patent application and subsequent filing of claims are without prejudice to seeking further protection.

If upon closer examination, in particular also of the relevant prior art, it is shown that one feature or another is advantageous for the objective of the invention but not crucially important, it is understood that a wording is sought which no longer has such a feature, in particular in the main claim. Such a subcombination is also encompassed by the disclosure of the present patent application.

It is further noted that the forms and variants of the invention described in the various embodiments and shown in the figures may be arbitrarily combined with one another. In this regard, individual or multiple features may be arbitrarily replaced with one another. These feature combinations are likewise disclosed herein.

The back-references stated in the dependent claims refer to the further embodiment of the subject matter of the main claim through the features of the respective subclaim. However, this is not to be construed as forgoing the seeking of independent, objective protection for the features of the back-referenced subclaims.

Features which have been disclosed only in the description, or also individual features of claims which include a plurality of features, may be incorporated at any time into the independent claim or claims as having importance essential to the invention for delimitation from the prior art, even if such features have been mentioned in conjunction with other features, or achieve particularly advantageous results in conjunction with other features.

The invention claimed is:

1. A pressure control valve comprising:
   at least one valve component situated between a control chamber and a return chamber, the valve component comprising:
      a valve housing and
      an orifice extending through an orifice element within the valve housing and having a longitudinal axis, the orifice comprising:
         a partially cylindrical through opening portion,
         at least one cone-like first orifice region with a cone angle (ß) relative to the longitudinal axis of the orifice, the cone-like first orifice region having an edge, formed at a transition from the through opening portion, at a first end; and
         a second orifice region comprising an orifice delimiting surface, at an orifice rim, the orifice rim forming an opening at a largest of at least one of an internal width and an internal diameter,
         wherein the orifice forms a first control surface at the edge at the transition and a second control surface at the orifice rim; and
      a control element comprising:
         at least one, at least truncated cone-like first control element region with a truncated cone angle (α) relative to the longitudinal axis of the orifice and adapted to at least one of close, partially close, and open the valve component; and
         a second control element region having a diameter greater than the opening at the largest of at least one of the internal width and the internal diameter,
         wherein the truncated cone angle (α) and the cone angle (ß) are defined such that each angle (α, ß) is smaller than 180°, and
         wherein the cone angle (ß) is greater than the truncated cone angle (α);
   wherein, in a closed state of the pressure control valve, at least a portion of the first orifice region of the orifice element can cooperate with at least a portion of the first control element region of the control element at the first orifice region to disconnect the control chamber from the return chamber, and wherein, in a partially open position of the pressure control valve, at the second control surface at the orifice rim, the second control element region of the control element is adapted to cover the second orifice region of the orifice element, to produce a throttling action.

2. The pressure control valve according to claim 1, wherein the first orifice region has a plurality of cone-like orifice region sections, each orifice region section of the plurality of orifice regions sections having at least partially different cone angles, and wherein at least one of the partially different cone angles is greater than the truncated cone angle.

3. The pressure control valve according to claim 2, wherein a second orifice region is situated in a different orifice region section than the first orifice region.

4. The pressure control valve according to claim 1, wherein the second control element region adjoins a base of at least one of a cone and a truncated cone.

5. The pressure control valve according to claim 1, wherein on a side of the first control element region that is oriented away from the orifice, the control element is adjoined by a second, control element region that is at least one of plate-like, cylinder-like, or disk-like.

6. The pressure control valve according to claim 1, wherein at least one of a height of the first control element region and a height of at least one of a cone and a truncated cone is greater than at least one of a height of the first orifice region and a height of the cone.

7. The pressure control valve according to claim 1, wherein the truncated cone angle ($\alpha$) is in a range from 10° to 90° and the cone angle (ß) is in a range from 50° to 120°.

8. The pressure control valve according to claim 1, wherein the orifice is provided between the control chamber and the return chamber and the valve component has a sub-valve, which is situated between the control chamber and a connection.

9. An electromagnetically actuated pressure control valve with a pressure control valve according to claim 1, wherein a drive component is an electromagnet, whose armature rod is at least one of connected and operatively connected to the control element.

10. The pressure control valve according to claim 1, wherein the second orifice region is provided at at least one of a rim of the orifice and a base of a cone.

11. The pressure control valve according to claim 1, wherein the first control element region and a second control element region are spaced apart from each other in a flow direction.

12. The pressure control valve according to claim 1, wherein the first control element region and a second control element region are spaced apart from each other in a direction of the longitudinal axis of the orifice.

13. The pressure control valve according to claim 1, wherein a first and a second control surface are spaced apart from each other in a flow direction.

14. The pressure control valve according to claim 1, wherein a first and a second control surface are spaced apart from each other in a direction of the longitudinal axis of the orifice.

15. The pressure control valve according to claim 14, wherein the truncated cone angle ($\alpha$) is in a range from 30° to 70 and the cone angle (ß) is in a range from 60° to 100°.

16. The pressure control valve according to claim 14, wherein the truncated cone angle ($\alpha$) is in a range from 45° to 65° and the cone angle (ß) is in a range from 70° to 90°.

17. The pressure control valve according to claim 1, wherein a difference between the cone angle (ß) and the truncated cone angle ($\alpha$) is in a range from 13° to 40°.

18. The pressure control valve according to claim 1, wherein a difference between the cone angle (ß) and the truncated cone angle ($\alpha$) is in a range from 20° to 35°.

19. The pressure control valve according to claim 1, wherein a difference between the cone angle (ß) and the truncated cone angle ($\alpha$) is in a range from 22° to 30°.

20. The pressure control valve according to claim 1, wherein the pressure control valve generates a progressive pressure control characteristic curve during operation.

21. The pressure control valve according to claim 1, wherein the pressure control valve has a drive component element that is adapted to move the control element against the orifice.

22. A pressure control valve comprising:
at least one valve component situated between a control chamber and a return chamber, the valve component comprising:
a valve housing and
an orifice extending through an orifice element within the valve housing and having a longitudinal axis, the orifice comprising:
a partially cylindrical through opening portion;
at least one cone-like first orifice region with a cone angle (ß) relative to the longitudinal axis of the orifice, the cone-like first orifice region having an edge, formed at a transition from the through opening portion, at a first end; and
a second orifice region comprising an orifice delimiting surface, at an orifice rim, the orifice rim forming an opening at a largest of at least one of an internal width and an internal diameter,
wherein the orifice forms a first control surface at the edge at the transition and a second control surface at the orifice rim; and
a control element comprising:
at least one, at least truncated cone-like first control element region with a truncated cone angle ($\alpha$) relative to the longitudinal axis of the orifice and adapted to at least one of close, partially close, and open the valve component; and
a second control element region having a diameter greater than the opening at the largest of at least one of the internal width and the internal diameter,
wherein the truncated cone angle ($\alpha$) and the cone angle (ß) are defined such that each angle ($\alpha$, ß) is smaller than 180°, and
wherein the cone angle (ß) is greater than the truncated cone angle ($\alpha$);
wherein, in a closed state of the pressure control valve, at least a portion of the first orifice region of the orifice element can cooperate with at least a portion of the first control element region of the control element at the first orifice region to disconnect the control chamber from the return chamber,
wherein, in a partially open position of the pressure control valve, at the second control surface at the orifice rim, the second control element region of the control element is adapted to cover the second orifice region of the orifice element, to produce a throttling action, and wherein a height of the first control element region is greater than a height of the first orifice region.

* * * * *